(12) United States Patent
Sánchez Dolado et al.

(10) Patent No.: US 10,889,523 B2
(45) Date of Patent: Jan. 12, 2021

(54) PROCESS FOR PRODUCING A CEMENT CLINKER AT LOW TEMPERATURE

(71) Applicant: FUNDACION TECNALIA RESEARCH & INNOVATION, Derio (ES)

(72) Inventors: Jorge Sánchez Dolado, Donostia-San Sebastián (ES); Jose Antonio Ibañez Gomez, Donostia-San Sebastián (ES); Naiara Azurmendi Apalategui, Donostia-San Sebastián (ES); Leire Bilbao Alba, Donostia-San Sebastián (ES); Jérôme Ibarzo, Donostia-San Sebastián (ES)

(73) Assignee: FUNDACION TECNALIA RESEARCH & INNOVATION, Derio (ES)

( * ) Notice: Subject to any disclaimer, the term of this patent is extended or adjusted under 35 U.S.C. 154(b) by 134 days.

(21) Appl. No.: 16/306,838

(22) PCT Filed: Jun. 7, 2017

(86) PCT No.: PCT/EP2017/063864
§ 371 (c)(1),
(2) Date: Dec. 3, 2018

(87) PCT Pub. No.: WO2017/211902
PCT Pub. Date: Dec. 14, 2017

(65) Prior Publication Data
US 2019/0135690 A1 May 9, 2019

(30) Foreign Application Priority Data

Jun. 8, 2016 (EP) .................................. 16382262

(51) Int. Cl.
| | | |
|---|---|---|
| *C04B 7/44* | (2006.01) | |
| *C04B 7/02* | (2006.01) | |
| *C04B 7/32* | (2006.01) | |
| *C04B 7/345* | (2006.01) | |
| *C04B 7/36* | (2006.01) | |
| *C04B 7/47* | (2006.01) | |
| *C04B 7/52* | (2006.01) | |
| *C04B 7/26* | (2006.01) | |
| *C04B 7/28* | (2006.01) | |

(52) U.S. Cl.
CPC .............. *C04B 7/4453* (2013.01); *C04B 7/02* (2013.01); *C04B 7/323* (2013.01); *C04B 7/3453* (2013.01); *C04B 7/3456* (2013.01); *C04B 7/367* (2013.01); *C04B 7/47* (2013.01); *C04B 7/52* (2013.01); *C04B 7/26* (2013.01); *C04B 7/28* (2013.01); *Y02P 40/10* (2015.11); *Y02P 40/121* (2015.11)

(58) Field of Classification Search
CPC .... C04B 7/02; C04B 7/26; C04B 7/28; C04B 7/323; C04B 7/3453; C04B 7/3456; C04B 7/367; C04B 7/4453; C04B 7/47; C04B 7/52; Y02P 40/10; Y02P 40/121
See application file for complete search history.

(56) References Cited

PUBLICATIONS

Fang, Yi, et al,"Microwave clinkering of ordinary and colored Portland cements", Cement and Concrete Research, vol. 26, pp. 41-47. (Year: 1996).*
International Search Report and Written Opinion dated Aug. 8, 2017 for PCT Application No. PCT/EP2017/063864, 12 pages.
Alvarez-Pinazo, G., et al. "Rietveld quantitative phase analysis of Yeelimite-containing cements", Cement and Concrete Research 2012, vol. 42, Issue 7, pp. 960-971.
Gartner, Ellis, "Industrially interesting approaches to "low-CO2" cements", Cement and Concrete Research 2004, vol. 34, pp. 1489-1498.
Hernandez, M.S., et al, "Synergy of T1-C3S and B-C2S Hydration reactions", American Ceramic Society 2011, vol. 94, No. 4, pp. 1265-1271.
Jansen, Daniel, et al. "A Remastered External Standard Method Applied to the Quantification of Early OPC Hydration", Cement and Concrete Research 2011, vol. 41, No. 6 pp. 602-608.
Ke, Kai, et al, "Formation of tricalcium silicate prepared by electric and microwave sintering", Advanced Materials Research 2011, Oct. 27, 2010, vol. 148, pp. 1119-1123.
Li, Haoxuan, et al, "Formation and hydration of C₃S prepared by microwave and conventional sintering", Cement and Concrete Research 1999, vol. 29, pp. 1611-1617.
Link, T., et al., "Reactivity and phase composition of Ca2SiO4 binders made by annealing of alpha-dicalcium silicate hydrate", Cement and Concrete Research 2015, vol. 67, pp. 131-137.
Long, Shizong, et al. "Microwave-promoted burning of Portland cement clinker", Cement and Concrete Research 2002, vol. 32, No. 1, pp. 17-21.

(Continued)

*Primary Examiner* — Anthony J Green
(74) *Attorney, Agent, or Firm* — Squire Patton Boggs (US) LLP (57) ABSTRACT

The invention provides a process for producing a cement clinker comprising: (i) mixing one or more starting materials providing each at least one or more of CaO, SiO$_2$, Al$_2$O$_3$, and Fe$_2$O$_3$; and, optionally, SO$_3$, to form a raw meal comprising CaO, SiO$_2$, Al$_2$O$_3$, and Fe$_2$O$_3$; and, optionally, SO$_3$, wherein the molar ratios among the aforementioned oxides is given by Formula I: $(CaO)_1(SiO_2)_a(Al_2O_3)_b(Fe_2O_3)_c(SO_3)_d$, wherein: "a" is comprised from 0.05 to 1, "b" is comprised from 0.01 to 0.6, "c" is comprised from 0.001 to 0.25, and "d" is comprised from 0 to 0.3 and wherein at least 35% (p/p) of the starting materials of the raw meal have a critical microwaves absorbance temperature (Tc) comprised from 15 to 650° C. and a critical microwaves absorbance time (tc) comprised from 1 min to 1 h; (ii) heating the raw meal by irradiating with microwaves during 15 min to 3 h to reach a sintering temperature comprised from 300 to 950° C.; (iii) maintaining the microwave sintering temperature of step (ii) during 1 min to 3 h by further irradiating with microwaves; and (iv) cooling the clinker obtained in step (iii).

14 Claims, 3 Drawing Sheets

(56) References Cited

PUBLICATIONS

Long, Shizong, et al. "Microwave promoted clinkering of sulfoaluminate cement", Cement and Concrete Research 2002, vol. 32, pp. 1653-1656.

Makul, et al: "Applications of microwave energy in cement and concrete—A review", Renewable and Sustainable Energy Reviews 2014; vol. 37, pp. 715-733.

* cited by examiner

PROCESS FOR PRODUCING A CEMENT CLINKER AT LOW TEMPERATURE

The present invention refers to the field of cement clinkers, in particular it refers to the production of environmental-friendly cement clinker at low temperature.

BACKGROUND ART

The construction sector (including the manufacture of building materials) is worldwide the third-largest $CO_2$ emitting industrial sector. It represents 10% of all $CO_2$ emissions derived from human activity. The vast majority of these emissions come from the provision of cement (85%), of which 95% is released during its manufacture. When compared to other building materials such as metals and glass, cement is often used in significantly higher quantities, particularly for heavy civil engineering projects such as roads, airports, dams and tunnels. Despite the embodied energy of cement being less than that of metals, when it is used to produce concrete it forms the second most consumed material in the world after water. In 2006, 30 billion tonnes concrete was consumed globally. The net heat balance for the manufacture of Ordinary Portland Cement (OPC) has been calculated theoretically as 1674-1799 kJ/kg. The actual value is much higher in reality (3100-3600 kJ/kg), if one was to account for the heat losses due to exhaust gasses and cooling processes.

Portland cement clinker is industrially made by heating a homogeneous mixture of raw materials in a rotary kiln at high temperature. The major raw material for the clinker-making is usually limestone mixed with a second material containing clay as source of alumino-silicate. Normally, an impure limestone which contains clay or silicon dioxide ($SiO_2$) is used. The calcium carbonate ($CaCO_3$) content of these limestones can be 80%. Second raw materials (materials in the rawmix other than limestone) depend on the purity of the limestone. Some of the second raw materials used are: clay, shale, sand, iron ore, bauxite, fly ash and slag. The products of the chemical reaction aggregate together to form the clinker at their sintering temperature, about 1,450° C. The process by which the raw materials form the clinker by sintering is often called clinkerization. Aluminium oxide and iron oxide are present in the process only as a flux to reduce the sintering temperature and contribute little to the cement strength. The obtained clinker typically contains alite ($Ca_3SiO_5$, or $C_3S$ in cement chemist notation), belite ($Ca_2SiO_4$, $C_2S$ in cement chemist notation), tricalcium aluminate ($(CaO)3(Al2O3)$, C3A in cement notation), and aluminoferrite ($(CaO)4(Al2O3)(Fe2O3)$, C4AF in cement notation), being alite the most important one.

Portland cement clinker is ground to a fine powder and used as the binder in many cement products. A little gypsum and/or various supplementary cementing materials (SCMs) are sometimes added. Upon treatment with water, clinker reacts to form a hydrate called cement paste. Upon standing, the paste polymerizes as indicated by its hardening. Alite reacts relatively rapidly with water and is responsible for most of the early strength development of concretes. Belite is less reactive at early ages, but can contribute appreciably to strength at later ages. SCMs contribute to the properties of hardened concrete through hydraulic or pozzolanic activity, making the cement products more economical or conferring diverse properties as reduced permeability or increased strength.

The sintering of the raw meal during pyro-processing to yield the cement clinker is considered one of the most energy intensive steps, accounting for approximately 60% of the total energy required. Any reduction in residence time within the sintering furnace and reduction of the required sintering temperature would comprise significant process benefits in terms of reduced production cost, embodied energy and carbon emissions.

For many years now the scientific community has been working on different approaches for producing more environmental-friendly Portland cement clinkers. In this sense, a limited amount of work has been undertaken on the use of microwave (MW) energy to aid the clinkerisation of cement raw meal.

Fang et al. (*Cem. Concr. Res.* (1996), vol. 26, p. 41-47) prepared Type 1 Ordinary Portland Cement (OPC) and a range of coloured cements (white cement plus pigmenting materials) in a 900 W, 2.45 MHz multimode cavity with a rotating turntable, essentially a domestic MW oven. A single pellet method of sintering was adopted and compared to conventional firing using an electric furnace. The results showed that both OPC and white/coloured cement can be prepared by MW processing. A MW enhancing effect was observed with respect to conventional firing, manifested by a reduction in free lime content, a reduction in clinkering temperature by 100° C. and the preferential growth of $C_3S$ in the MW field. While the researchers were able to demonstrate in principle that the technique could work, it is suspected that the process consumed relatively massive amounts of energy to produce a small pellet of material. This would negate any benefit from the otherwise limited reduction in clinkering temperature.

The preparation of $C_3S$ with MW was also undertaken by Li et al. (*Cem. Concr. Res.* (1999), vol. 29, p. 1611-1617) who again found that MW sintering temperature was reduced by 100-150° C. However, the reported reduction of 100-150° C. in clinkering temperature still doesn't provide a great advantage and definitely does not justify the investment required for new equipment in industrial plants.

The heating mechanism in the above studies was reported to be solely from MW energy. Another approach was described by Ma et al. (*Adv. Mater. Res.* (2011), vol. 148, p. 1119-1123), who stated that the coupling of the raw meal with MW energy at low temperatures is not sufficient to induce volumetric heating and, consequently, used a combined process, where the raw meal was first heated to a critical temperature (1500° C.); at which the MW absorbability of the materials is optimised, and then transferred to a MW cavity for sintering (1000W, 2.45 GHz, power density 45 kWm-3). Compared to conventional sintering, XRD peaks of $C_3S$ were found to be stronger in the combined process. Nevertheless, once again the process did not bring any relevant advantages in environmental terms (note that sintering temperature is very high).

In line with the combined heating method disclosed by Ma et al, Long et al (*Cement and Concrete Research* (2002), vol. 32(1), p. 17-21) disclosed a method of production of Portland cement clinker by MW sintering after heating of the raw meal to 1000-1200° C. in an electric furnace. It has also been found that the higher the temperature of the samples put into the MW cavity, the shorter the time needed for MW sintering. When using MW as sole heating method, $CaCO_3$ in the samples was not yet decomposed completely after being heated for 25 min in the MW cavity (temperature not disclosed), meaning that sole MW heating did not achieve good yields of clinker production. The authors conclude that the combined method may increase the forming speed of Portland cement clinkers.

MW promoted clinkering of calcium sulfoaluminate cements (C$A) has also been reported by S. Long et al. (*Cement and Concrete Research* 32 (2002) 1653-1656). Differently to OPCs which relies on the formation of Alite, C$A clinkers relies on the formation of a Klein's salt, yeelemite ((CaO)4(Al2O3)3(SO3), C4A3$ in cement notation). With respect to OPCs C$A clinkers offer some environmental advantages since they can be synthesized in normal kilns with less limestone, at lower temperatures (about 1250° C.). However, as in the case of OPCs, the previously mentioned MW promoted clinkerization process reported a modest reduction of the clinkerization temperature and also required a preheating treatment in electrical furnace at temperatures ranging from 1000° C. to 1200° C.

Altogether, the state of the art reports a limited reduction in clinkering temperature using MW treatment. Given only the marginal savings in energy, or conversely slight increase in throughput that is inferred, the capital cost alone of an industrial system able to provide both the electric and MW energy could never be justified. The lack of experimental success in obtaining substantial environmental benefits by use of MW-assisted sintering has therefore hindered further advances in this technology.

It is altogether clear that new methods are needed to obtain more environmental-friendly cement clinkers with reduced embodied energy, reduced carbon emission and lower cost.

SUMMARY OF THE INVENTION

The inventors have surprisingly found that a low temperature, low $CO_2$-emitting process for the production of cement clinker is achieved by subjecting selected starting materials to MW energy.

Thus, a first aspect of the invention refers to a process for producing a cement clinker comprising the steps of:
(i) mixing one or more starting materials providing each: at least one or more of CaO, $SiO_2$, $Al_2O_3$, $Fe_2O_3$ and, optionally $SO_3$; and/or at least other one or more compounds comprising the elements of these oxides, to form a raw meal comprising CaO, $SiO_2$, $Al_2O_3$, and $Fe_2O_3$; and, optionally, $SO_3$; and/or at least other one or more compounds comprising the elements of these oxides, wherein the molar ratios among the aforementioned oxides and/or other one or more compounds comprising the elements of these oxides is given by Formula I:

(Formula I)

$(CaO)_1(SiO_2)_a(Al_2O_3)_b(Fe_2O_3)_c(SO_3)_d$ wherein:
"a" is comprised from 0.05 to 1,
"b" is comprised from 0.01 to 0.6,
"c" is comprised from 0.001 to 0.25, and
"d" is comprised from 0 to 0.3;
(ii) heating the raw meal by irradiating with microwaves until reaching a sintering temperature comprised in a range from 300 to 950° C., wherein the irradiating time to reach the sintering temperature is comprised in a range from 15 min to 3h;
(iii) maintaining the microwave sintering temperature of step (ii) during a time comprised from 1 min to 3 h by further irradiating with microwaves; and
(iv) cooling the clinker obtained in step (iii)

The process of the invention has the advantage of achieving high quality clinker containing hydraulically active phases at temperatures significantly lower than prior art approaches. For instance, while conventional processes for obtaining OPC clinkers require sintering temperatures around 1450° C., the process of the invention achieves these type of clinker at temperatures below 950° C. In general, the process of the invention achieves a reduction of 300-600° C. with respect to conventional sintering methods. The overall energy consumption for the process of the invention is lower than conventional clinkering. Importantly, the process of the invention achieves a reduction of 40% with respect to $CO_2$ emissions. Further, the process may be performed in conventional MW equipment without the need to couple a further electric heating system. Altogether, the inventors have provided a process for producing cement clinker which is significantly more environmental-friendly that prior art approaches while maintaining good quality clinker product.

A second aspect of the invention provides a cement clinker obtainable by the above process, while a further aspect provides a powder clinker obtainable by the process of the invention. This clinker powder may be mixed with water and, optionally, supplementary cementing materials or gypsum, in order to produce concrete or other cementious materials. Thus, the invention also refers to use of the clinker powder obtainable by the process of the invention as binder, and a concrete or other cementious material comprising the clinker powder obtainable by the process of the invention.

DETAILED DESCRIPTION OF THE INVENTION

The invention is related to a process for producing (low temperature) environmental-friendly cement clinker.

The first step in the process of the invention is mixing one or more starting materials each providing: at least one or more of CaO, $SiO_2$, $Al_2O_3$, $Fe_2O_3$ and, optionally $SO_3$; and/or at least other one or more compounds comprising the elements of these oxides, to form a raw meal comprising CaO, $SiO_2$, $Al_2O_3$, and $Fe_2O_3$; and, optionally, $SO_3$; and/or at least other one or more compounds comprising the elements of these oxides, wherein the molar ratios among the aforementioned oxides and/or other one or more compounds comprising the elements of these oxides is given by Formula I.

By "CaO, $SiO_2$, $Al_2O_3$, $Fe_2O_3$ and, optionally $SO_3$; and/or other one or more compounds comprising the elements of these oxides", it is meant, as will be evident to a skilled person familiar with the field of cement clinkers, that the raw meal comprises compounds that contain Ca and O, Si and O, Al and O, Fe and O, and optionally, S and O. Said compounds may be the mentioned CaO, $SiO_2$, $Al_2O_3$, $Fe_2O_3$ and $SO_3$ oxides, but can also be other oxides or hydroxides of these elements, such as $Fe_3O_4$, $CaSO_4$, $Ca(OH)_2$ and sulfoferrite, or minerals containing these elements, such as silicates, aluminosilicates, calcium silicates, etc. The starting materials provide at least one or more of the required CaO, $SiO_2$, $Al_2O_3$, $Fe_2O_3$ and, optionally, $SO_3$; and/or at least other one or more compounds comprising the elements of these oxides and may be chosen from the isolated oxides, hydroxydes, natural minerals, clays or a wide variety of materials like cement paste, slag, fly ash or other wastes and by products so long as when they are mixed forming the raw meal and irradiated with MWs they reach a sintering temperature comprised in a range from 300 to 950° C. in less than 3 h and the raw meal contains the above compounds in a stoichiometrical composition that is expressed by formula I.

Formula I represents the stoichiometrical molar ratios of CaO, $SiO_2$, $Al_2O_3$, $Fe_2O_3$ and $SO_3$ oxides, and/or other one or more compounds comprising the elements of these oxides comprised in the raw meal. The molar ratio represents the proportion of the compounds when expressed in molar concentration. The proportions expressed by formula I are appropriate for yielding the herein developed cement clinker. Additionally, as is known by the skilled person in the field of cement clinkers formula I also reflects the molar proportion of the resulting clinker.

The raw meal necessarily comprises CaO, $SiO_2$, $Al_2O_3$, $Fe_2O_3$ and $SO_3$ oxides, and/or other one or more compounds comprising the elements of these oxides stoichiometrical molar ratios expressed by Formula I. However, the raw meal may sometimes additionally contain other oxides like $Na_2O$, $K_2O$, MgO, MnO, $TiO_2$ as minoritary components. The amount of these minoritary components is often from 0.001 to 5% (w/w), sometimes from 0.001 to 10% of the raw meal but they should not comprise above 10% (w/w) relative to the weight of the total raw meal.

The resulting clinker is also characterized by the cementing active hydraulic phases that are formed by the sintering process. Said active phases are C3S (alite), C2S (belite), C3A (celite), C12A7, C4A3F, C4A3$, C4AF and C$, and their formation is temperature dependent. In this sense, different types of clinkers are distinguished in the art depending on their content in active phases:

Alite based clinkers have a generic stoichiometric formula $(CaO)_1(SiO_2)_a(Al_2O_3)_b(Fe_2O_3)_c(SO_3)_d$, wherein: "a" is in the range from 0.05 to 1, "b" is in the range from 0.01 to 0.6, "c" is in the range from 0.001 to 0.25 and "d" is in the range from 0 to 0.3. Central to the Alite based clinkers is the formation of C3S, which is their most important hydraulic phase and the one that determines their sintering temperature (1350° C.-1450° C. in conventional kilns). Alite based clinkers comprise from 10 to 90% (w/w) Alite (C3S), or from 25 to 90% Alite, or from 25 to 85% Alite, with respect to total clinker product (percentages of the hydraulic phases are herein given as % weight with respect to the weight of the OPC product, i.e. % w/w).

Portland Cement (also called Ordinary Portland Cement, "OPC") clinkers have a generic stoichiometric formula $(CaO)_1(SiO_2)_a(Al_2O_3)_b(Fe_2O_3)_c$, wherein: "a" is in the range from 0.2 to 0.5, "b" is in the range from 0.01 to 0.05, "c" is in the range from 0.001 to 0.05. Central to the OPC clinkers is the formation of C3S, which is their most important hydraulic phase and the one that determines their sintering temperature (1350° C.-1450° C. in conventional kilns). OPCs typically contain the following active hydraulic phases: 25-75% C3S, 5-35% C2S, 0-15% C3A and 0-20% C4AF.

(Calcium) Sulfoaluminate (C$A) clinkers have a generic stoichiometric formula $(CaO)_1(SiO_2)_a(Al_2O_3)_b(Fe_2O_3)_c(SO_3)_d$, wherein: "a" is in the range from 0.05 to 0.5, "b" is in the range from 0.01 to 0.6, "c" is in the range from 0.005 to 0.1, and "d" is in the range from 0.05 to 0.3. Central to Sulfoaluminate clinkers is the formation of Yeelimite (C4A3$), which allows to achieve short-term high resistance and determines the sintering temperature (around 1250° C. and 1350° C. in conventional kilns). C$As typically contain 35-75% C4A3$, 15-35% C2S and 3-30% C4AF. C$A clinkers may also contain from 0 to 20% of other of other crystalline or amorphous phases (G. Álvarez-Pinazo et al., *Cement and concrete Research* (2012), vol. 42, Issue 7, p. 960-971)

Alite-C$A clinkers are recently developed clinkers which combine C3S and C4A3$ as main active phases. They have a generic stoichiometric formula $(CaO)_1(SiO_2)_a(Al_2O_3)_b(Fe_2O_3)_c(SO_3)_d$, wherein: "a" is in the range from 0.05 to 0.5, "b" is in the range from 0.01 to 0.6, "c" is in the range from 0.005 to 0.1, and "d" is in the range from 0.05 to 0.3. In Alite-C$A clinkers C3S determines the sintering temperature (around 1350° C. and 1450° C. in conventional kilns). Alite-C$A clinkers typically contain 30-50% C3S, 30-40% C2S, 5-20% C4A3$ and 3-10% C4AF. Alite-C$A clinkers may also contain from 0 to 20% of other crystalline or amorphous phases.

Belite clinkers have a generic stoichiometric formula $(CaO)_1(SiO_2)_a(Al_2O_3)_b(Fe_2O_3)_c$, wherein: "a" is in the range from 0.3 to 0.5, "b" is in the range from 0.01 to 0.05, and "c" is in the range from 0.001 to 0.05. Central to the Belite clinkers is the formation of C2S, which is their most important phase and the one that determines their sintering temperature (1150° C.-1250° C. in conventional kilns). Belite clinkers usually contain Belite (15-90%), C12A7 (0-20%), C4AF (0-20%) and Gehlenite (0-40%). Belite clinkers may also contain up to 50% of other of other crystalline or amorphous phases (T. Link et al., *Cement and Concrete Research* 67 (2015) 131-137)

The most appropriate starting materials that allow to obtain cement clinkers by MW technology as defined in the process of the invention at low temperatures (below 950° C.) and with low $CO_2$ emmission have particular features. In a particular embodiment, the one or more starting materials providing $SiO_2$ and/or the other compounds comprising the elements of this oxide, have a critical microwaves absorbance temperature (Tc) from 15 to 650° C. and critical microwaves absorbance time (tc) from 1 to 30 min.

"Critical microwave absorbance temperature (Tc)" is the temperature at which the starting material significantly improves its ability to absorb MWs (i.e. it corresponds to a falling point of inflection where the derivative of T as a function of time is a local maxima).

"Critical microwave absorbance time (tc)" is the time needed for a starting material to reach its Tc, and depends on the applied MW intensity and the amount of material to be heated. The critical MW absorbance times herein disclosed are referred to a MW intensity of 1000 W and 100 g of material. For example, fly ash with a composition as defined in example 1 has a Tc of 475° C., and a tc of 22 min when MW intensity is 1000 W.

In another embodiment, the one or more starting materials providing $Al_2O_3$ and/or the other compounds comprising the elements of this oxide have a Tc from 15 to 650° C. and tc from 1 to 30 min. In another embodiment, the starting material providing $Fe_2O_3$ and/or the other compounds comprising the elements of this oxide has a Tc from 15 to 100° C. and tc from 1 to 15 min. In another embodiment, the one or more starting materials providing $SO_3$ and/or the other compounds comprising the elements of this oxide, if present, have Tc from 15° C. to 650° C. and tc from 1 min to 30 min. In another embodiment, the one or more starting materials providing CaO and/or the other compounds comprising the elements of this oxide are selected from calcium oxides, in particular CaO. In another embodiment, the one or more starting materials providing CaO and/or the other compounds comprising the elements of this oxide have a Tc from 20 to 900° C. and tc from 1 min to 2 h. In other embodiments the one or more starting materials providing $SiO_2$, $Al_2O_3$, $Fe_2O_3$ and, optionally $SO_3$, and/or the other compounds comprising the elements of these oxides, have the characteristics mentioned above. In other embodiments, the one or more starting materials providing CaO and/or the other compounds comprising the elements of this oxide are selected from calcium oxides and compounds that have a Tc from 20 to 900° C. and tc from 1 min to 2h. In particular embodiments at least one of the starting materials providing CaO is CaO.

The Tc and tc is different for each starting material, being generally lower for the starting materials providing $Fe_2O_3$ or the other compounds comprising the elements of this oxide and higher for the starting materials providing CaO. In fact, CaO itself has no defined Tc, although it does reach the required sintering temperature in the required time when irradiated with MWs. In any case, the preferred starting materials are selected such that their Tc and tc are as low as possible, with the exception in particular embodiments of CaO, which is sometimes needed for stoichiochemical reasons despite its apparent transparency to MWs.

Taking into account the great differences between Tc and tc of the required materials to form the raw meal, it is important that at least 35% (w/w) of the starting materials in the raw meal have a Tc comprised from 20 to 650° C. and a tc comprised from 1 min to 1h. Thus in one embodiment of the process of the invention, from 35% to 100% of the starting materials in the raw meal have a Tc comprised from 20 to 650° C. and a tc comprised from 1 min to 1h. In particular embodiments the percentage of materials that have a Tc comprised from 20 to 650° C. and a tc comprised from 1 min to 1 h is comprised from 40%, 45%, 50%, 55%, 60%, 65%, 70%, 75%, 80%, 85%, 90% or 95% to 100% (all above percentages are referred to percentages by weight (w/w). In another embodiment of the process of the invention, from 35% to 100% of the starting materials in the raw meal have a Tc comprised from 35 to 550° C. and a tc comprised from 15 min to 1h The remaining starting materials of the raw meal must nevertheless reach a sintering temperature comprised in a range from 300 to 950° C., in particular from 300 to 900° C., more particularly from 300 to 850° C. in less than 3 h (from 1 min to 3 h), regardless of their Tc and tc.

The inventors have further identified the most appropriate materials that allow to obtain cement clinkers by MW technology as defined in the process of the invention. In one particular embodiment, the one or more starting materials providing $Fe_2O_3$ and/or the other compounds comprising the elements of this oxide are selected from iron oxides, iron oxyhydroxides, iron sulfides, calcium ferrites, iron-containing nesosilicates, iron-containing sorolicates, iron-containing ionosilicates and iron-containing phyllosilicates. Iron oxides such as hematite ($Fe_2O_3$) or magnetite ($Fe_3O_4$) as well as ferrites containing these oxides and iron-containing neosilicates are particularly well suited starting materials. More particularly, the one or more starting materials providing $Fe_2O_3$ and/or the other compounds comprising the elements of this oxide are selected from $Fe_2O_3$, $Fe_3O_4$, Fayalite, Andradite Staurolite, Datolite, Titanite, Humite, Chloritoid, $(Mg,Fe)_7(SiO_4)_3(OH)_2$ and $((Mg,Fe)_7(SiO_4)_3(F, OH)_2)$.

In another embodiment, the one or more starting material providing $SiO_2$ and/or the other compounds comprising the elements of this oxide are selected from nesosilicates, sorolicates, ionosilicates, phyllosilicates and defected and amorphous tectosilicates. Again, starting materials such as neosilicates, are preferred. Also, defected and glassy-like amorphous structures as those usually found in byproducts like slags and fly-ashes are preferred. More particularly, the one or more starting material providing $SiO_2$ and/or the other compounds comprising the elements of this oxide are selected from $C_2SH$, afwillite, xonotlite, tobermorite and calcium silicate hydrate (C—S—H).

In another embodiment, the one or more or starting materials providing $Al_2O_3$ and/or the other compounds comprising the elements of this oxide are selected from aluminium-containing nesosilicates, aluminium-containing sorolicates, aluminium-containing ionosilicates, aluminium-containing phyllosilicates and aluminium-containing defected and amorphous tectosilicates. Preferred starting materials include aluminosilicates with a large population of defects (eg Si by Al substitutions), in particular, aluminium-containing neosilicates. Defected and glassy-like amorphous structures as those usually found in byproducts like slags and fly-ashes are also preferred. More particularly, the one or more starting material providing $Al_2O_3$ and/or the other compounds comprising the elements of this oxide are selected from aluminium partially substituted variants of: $C_2SH$, afwillite, xonotlite, tobermorite and calcium silicate hydrate (C—S—H). By "aluminium partially substituted variants" it is understood that Al partially replaces Si in the (crystalline) structure of the mentioned compounds. "Partially" may be from Al/Si from 0.01 to 0.5, preferably from 0.2 to 0.5 of Al substitution (expressed in molar ratio).

In another embodiment, the one or more starting material providing CaO and/or the other compounds comprising the elements of this oxide are selected from calcium oxides, calcium hydroxides, calcium carbonates, calcium ferrite, calcium sulfates, calcium-containing aluminosilicates, calcium-containing nesosilicates, calcium-containing sorolicates, calcium-containing ionosilicates, and calcium-containing phyllosilicates. Materials containing Fe, such in the case of calcium Ferrite (as the one found in lime ferrite slags) or calcium aluminosilicates are preferred sources of CaO. More particularly, the one or more starting material providing CaO and/or the other compounds comprising the elements of this oxide are selected from $CaCO_3$, CaO, $Ca(OH)_2$, $CaSO_4.2H_2O$, $CaFe_2O_4$, $Ca_2Fe_2O_5$, $C_2SH$, afwillite, xonotlite, tobermorite and calcium (aluminium) silicate hydrate (C-(A)-S—H).

In another embodiment, the one or more starting materials providing $SO_3$ and/or the other compounds comprising the elements of this oxide, if present, are selected from sulfoferrite and gypsum. Sulfoferrite is particularly suitable.

In general, suitability of the compounds mentioned above as starting materials for the process of the invention is enhanced if they are hydrated and/or hydroxylated. Hydrated starting materials are generally preferred.

In particular embodiments of the process of the invention, one or more of the starting materials are selected from wastes and by products. Use of wastes and by-products as starting materials reports environmental advantages, in particular, for example, avoiding economical and environmental expenses related to mining activities and enhancing recycling. However, not any mineral waste or by-product is suitable as starting material for the process of the invention. Suitable wastes and by-products may be selected from cement paste, fly ash and slag. Thus, in particular embodiments one or more of the starting materials are selected from cement paste, fly ash, slag and calcium oxides. In other particular embodiments the starting materials are selected from cement paste, fly ash, slag, calcium oxides and mixtures thereof.

"Cement paste" in the sense of the present invention is understood as the mixture of water, clinker and, optionally, different additives such as gypsum or SCMs, after setting and hardening. It is therefore meant recycled cement paste. This material is particularly well suited as staring material for the process of the invention because it contains the appropriate components and stoichiometry as defined in Formula I. Further, cement paste contains hydrated compounds such as C-(A)-S—H and which, as explained above, are suitable compounds for the process of the invention.

Fly ash is a by-product of thermal power generating stations. Commercially available fly ash is a finely divided residue that results from the combustion of pulverized coal and is carried from the combustion chamber of the furnace by exhaust gases. The main compounds encountered in fly ashes are in a glassy state which, as explained above, are suitable compounds for the process of the invention. Besides fly ashes can contain crystalline structures like mullite, iron oxides (hematite, magnetite and/or maghemite), cristobalite, anhydrite, free lime, periclase, calcite, sylvite, halite, portlandite, rutile and anatase. Preferred fly ashes for the process of the invention are those containing low proportions of quartz and cristoballite and large proportions of glassy compounds like mullite or iron oxides.

Slag, formerly referred to as ground granulated blast-furnace slag, is a glassy, granular material formed when molten, iron blast-furnace slag is rapidly chilled—typically by water sprays or immersion in water—and subsequently ground to cement fineness. Slag contains glassy ferrous silicates which, as explained above, are suitable compounds for the process of the invention. Preferred slags for the process of the invention are those containing neosilicates, in particular, fayalite.

Particular combinations of starting materials may be advantageous for producing cement clinkers at low temperature by the process of the invention. According to the invention, the starting materials can be tuned so as to optimize the absorption heating mechanism by synergic interactions. This is achieved by mixing materials whose Tc form a continuous and dense sampling between the minimum Tc (minTc) and maximum Tc (maxTc). In this way, once the first element (i.e the one with lower Tc) absorbs the MWs, the temperature of the whole system is raised by conductive heating, but not much power is lost in conductive heating, as rapidly the second element (the one with the second lowest Tc) starts to absorb MW energy and contributes to heat the system too, and so on. This tuning does not alter the sintering temperature but it does reduce the amount of energy needed to reach said temperature, contributing to the overall energy and $CO_2$ savings.

In a particular embodiment, the starting materials at least comprise a cement paste. This means that the raw mix comprises cement paste, which may be accompanied by other starting materials, such as slag or a calcium oxide, in order to arrive at the required stoichiometry. In other embodiments the starting materials at least comprise a cement paste and a slag. This combination of starting materials in the raw meal is particularly suitable to produce low temperature) clinkers and to recycle concrete. Other particularly suitable combination of starting materials is that comprised by fly ash and a slag. The slag in these—and other—combinations is preferably a slag containing neosilicates, in particular, fayalite. Often the preferred starting materials do not provide enough CaO as required for clinker production, thus a calcium oxide must be added to the raw mix to reach the appropriate stoichiometry. When a starting material providing CaO and/or the other compounds comprising the elements of this oxide must be added to the raw mix in addition to one of the mentioned wastes or by-products, said starting material is preferably $Ca(OH)_2$, $CaSO_4.xH_2O$ and calcium (aluminium) silicate hydrates (C-(A)-S—H).

Other particular combinations of starting materials are: slag fly ash and CaO; a starting material containing sulfoferrite, slag, fly ash and CaO; a combination of starting material containing katoite, Calcium Aluminium Silicate Hydrate minerals and slag; a combination of starting materials containing slag, Calcium Aluminium Silicate Hydrate minerals and CaO; a combination of starting materials containing, slag, Calcium Aluminium Silicate Hydrate minerals and sulfoferrite; a combination of starting materials containing, slag, fly ash, gypsum and CaO.

The process requires that the raw meal is irradiated with MW to reach the sintering temperature (step (ii) in the process according to the first aspect of the invention). "Sintering" is generally known as the process of compacting and forming a solid mass of material by heat and/or pressure without melting it to the point of liquefaction. In the field of cement clinkers, and thus in the sense of the present invention, "sintering temperature of the raw meal" is particularly understood as the temperature at which the compounds in the raw meal transform into a clinker, i.e. the temperature that allows for the formation of required hydraulic active phases (alite, belite, yeelimite, etc). The term "clinkering" is often employed with the same meaning as "sintering".

The sintering temperature in the process of the invention is comprised in a range from 300° C. to 950° C. This is a significant reduction in sintering temperature with respect to prior processes for producing cement clinkers. As mentioned above, the low sintering temperature, in addition to use of MW energy, significantly contributes to the overall energy and $CO_2$ emmission savings of the process of the invention. In particular embodiments the sintering temperature is comprised in a range from 300 to 900° C., or from 350 to 950° C., or from 300 to 850° C., or from 350 to 850° C. The time needed by the raw meal to reach this sintering temperature is also important and must be comprised in a range from 15 min to 3 h. In particular embodiments, the time to reach the sintering temperature is comprised in the range from 15 min to 2 h, or from 15 min to 1.5 h, or from 20 min to 3 h, or from 20 min to 2.5 h, or from 20 min to 2 h, or from 20 min to 1.5 h or from 30 min to 2 h, or from 30 min to 1.5 h, or from 30 min to 1 h. In particular embodiments the sintering temperature is comprised in a range from 300 to 950° C. and the time needed by the raw meal to reach this sintering temperature is comprised in a range from 20 min to 1.5 h. In other particular embodiments the sintering temperature is comprised in a range from 300 to 900° C. and the time needed by the raw meal to reach this sintering temperature is comprised in a range from 30 min to 1 h.

In one embodiment, the sintering temperature in step (ii) is reached by irradiating with MWs as sole energy source.

Once the raw meal has reached the sintering temperature, this temperature must be maintained during enough time for the clinker to be formed by further irradiating with MWs (step (iii) in the process according to the first aspect of the invention). The latter time is comprised from 1 min to 3 h. In particular embodiments, the time in step (iii) in the process according to the first aspect of the invention is comprised from 5 min to 2.5 h, or from 5 min to 2 h, or from 5 min to 1.5 h, or from 5 min to 1 h, or from 5 min to 45 min, or from 5 min to 30 min, or from 10 min to 2 h, or from 10 min to 1.5 h, or from 10 min to 1 h, or from 10 min to 45 min, or from 10 min to 30 min, or from 15 min to 45 min.

In a particular embodiment, in step (iii) MWs is the sole energy source used.

The MW intensity in steps (ii) and (iii) may be the same or different, and it may be constant or variable. For example, MW intensity in step (ii) and/or step (iii) may gradually increase or increase in two or more sections. The MW intensity will be selected so as to obtain the sintering temperature in the shortest time possible. On the one hand too high intensities (above 3000W) can provoke plasma formation due to the incapacity of the raw material to absorb the released energy and the clinkerization process fails. On the other hand, low intensities would require far too long sintering times, which is also not desirable. Besides, below 300 W intensity clinkering does not proceed either. Generally speaking, the MW intensity is comprised from 300 to 3000 W, in particular from 500 to 2000 W.

As mentioned above, depending on the starting materials comprising the raw meal, the process may be tuned varying the MW intensity in step (ii) (when needed) to optimize energy consumption in such a way that the energy consumed for jumping from Tc (x) to Tc (x+1) is as low as possible, where (x) ranges from 1 to N, being N the number of components of raw meal and they are ordered in terms of increasing Tc.

Once the clinker has been formed, it is allowed to cool (step (iv) in the process according to the first aspect of the invention), usually to room temperature. The obtained clicker may be used as the binder in many cement products. Additionally, the obtained clinker is often grinded to a fine powder by any suitable means. By "fine powder" it is understood a powder having Blaine surface areas comprised from 2000 to 12000 $cm^2/gr$, preferably from 3000 to 12000 $cm^2/gr$ The powdered clinker may be used as the binder in many cement products.

The clinker obtainable from the process defined above comprises the active phases contained in conventionally cement clinkers. Depending on the stoichiometry of the raw meal and the temperature the clinker obtained by the process of the invention will comprise a particular composition of active phases, thus being catalogued as a particular type of cement clinker.

Thus, one embodiment of the invention provides a process for producing a clinker comprising from 10 to 90% (w/w) Alite (C3S) with respect to the total clinker product, wherein:
(i) formula I of the raw meal has the following stoichiometry: "a" is comprised from 0.05 to 1, "b" is comprised from 0.01 to 0.6, "c" is comprised from 0.001 to 0.25, "d" is comprised from 0 to 0.3; and
(ii) the sintering temperature is comprised from 500 to 950° C.

In a particular embodiment the sintering temperature is comprised from 650 to 900° C., more particularly from 700 to 850° C. The clinker obtainable by the above process contains from 10% to 90% Alite, or from 25% to 75% % Alite. It may also contain from 0 to 20% of other of other crystalline or amorphous phases.

Another embodiment of the invention provides a process for producing an Ordinary Portland Cement (OPC) clinker, wherein:
(i) formula I of the raw meal has the following stoichiometry: "a" is comprised from 0.2 to 0.5, "b" is comprised from 0.01 to 0.05, "c" is comprised from 0.001 to 0.05, and d is 0.
(ii) the sintering temperature is comprised from 500 to 950° C.

In a particular embodiment the sintering temperature is comprised from 650 to 900° C., more particularly from 700 to 850° C. The OPC clinker obtainable from the above process usually contains 25-75% C3S, 5-35% C2S, 0-15% C3A and 0-20% C4AF as main hydraulic active phases.

Conventional manufacture of OPC clinkers usually has a large net environmental impact. Compositionally, increased limestone quantities in the raw feed are required to form alite, which results in higher associated $CO_2$ emissions from calcination. Further, the volume of OPC clinkers produced worldwide is significantly higher when compared to other types of clinkers. Thus, the reduction in $CO_2$ emissions and energy consumption achieved by the present process has a great beneficial environmental (and economical) impact. Particularly suitable starting materials for producing OPC clinker according to the invention are slag, fly ash, calcium aluminosilicate hydrates and calcium ferrites.

In another embodiment the process of the invention is for producing a Belite clinker, wherein:
(i) formula I of the raw meal has the following stoichiometry: "a" is comprised from 0.3 to 0.5, "b" is comprised from 0.01 to 0.05, "c" is comprised from 0.001 to 0.05, and "d" is 0; and
(ii) the sintering temperature is comprised from 300 to 650° C.

In a particular embodiment the sintering temperature is comprised from 400 to 600° C. Particularly suitable starting materials for producing Belite clinker according to the invention are calcium aluminosilicate hydrates, slag and calcium ferrites. The Belite clinker obtainable from the above process usually contains Belite (15-90%, C12A7 (0-20%), C4AF (0-20%) and gehlenite (0-40%), and may also contain from 0 to 50% of other of other crystalline or amorphous phases. In a particular embodiment the Belite clinker obtainable by the above process comprises from 15 to 75% (w/w) Belite in the form of $\alpha'_L C2S$ with respect to total clinker product.

In another embodiment the process of the invention is for producing a Calcium Sulfoaluminate clinker, wherein:
(i) formula I of the raw meal has the following stoichiometry: "a" is comprised from 0.05 to 0.5, "b" is comprised from 0.01 to 0.6, "c" is comprised from 0.005 to 0.10, "d" is comprised from 0.05 to 0.3; and
(ii) the sintering temperature is comprised from 500 to 850° C.

In a particular embodiment the sintering temperature is comprised from 550 to 800° C., more particularly from 650 to 850° C. Particularly suitable starting materials for producing C$A clinkers according to the invention are slag, fly-ash, calcium aluminosilicate hydrates, gypsum and sulfoferrites. The Calcium Sulfoaluminate clinkers obtainable by the above process typically contain 35-75% C4A3$, 15-35% C2S and 3-30% C4AF, and may also contain from 0 to 20% of other of other crystalline or amorphous phases.

In another embodiment the process of the invention is for producing an Alite-C$A clinker, wherein:
(i) formula I of the raw meal has the following stoichiometry: "a" is comprised from 0.05 to 0.5, "b" is comprised from 0.01 to 0.6, "c" is comprised from 0.005 to 0.1, and "d" is comprised from 0.05 to 0.3; and (ii) the sintering temperature is comprised from 500 to 950° C. In a particular embodiment the sintering temperature is comprised from 650 to 900° C., more particularly from 700 to 850° C. Particularly suitable starting materials for producing Alite-C$A clinkers according to the invention are slag, fly-ash, calcium aluminosilicate hydrates, gypsum and sulfoferrites. The Alite-C$A clinkers obtainable by the above process typically contain 30-50% C3S, 30-40 C2S, 5-20% C4A3$ and 3-10% C4AF. Alite-C$A clinkers may also contain from 0 to 20% of other crystalline or amorphous phases.

Throughout the description and claims the word "comprise" and variations of the word, are not intended to exclude other technical features, additives, components, or steps. Furthermore, the word "comprise" encompasses the case of "consisting of". Additional objects, advantages and features of the invention will become apparent to those skilled in the art upon examination of the description or may be learned by practice of the invention. The following examples and drawings are provided by way of illustration, and they are not intended to be limiting of the present invention. Furthermore, the present invention covers all possible combinations of particular and preferred embodiments described herein.

EXAMPLES

Example 1: CK1: OPC Clinker

In this particular example, 3 starting materials were employed for preparing a MW-based Clinker (CK1). The materials were Fayalite containing slag (SLG), fly ash (FA) and calcium oxide (CaO). The compositions of these starting materials are collected in Table 1. These elements were mixed in the proportions given in Table 2.

TABLE 1

Elemental compositions of SMP and FA used as starting materials

|  | LOI | $SiO_2$ | $Al_2O_3$ | $Fe_2O_3$ | MgO | $K_2O$ | $Na_2O$ | CaO | $SO_3$ |
|---|---|---|---|---|---|---|---|---|---|
| SLG | — | 31.65 | 3.79 | 60.14 | 0.65 | 0.8 | 0.46 | 2.19 | 2.55 |
| FA | 5.78 | 50.8 | 25.37 | 5.14 | 1.76 | 1.73 | 0.44 | 5.97 | — |

TABLE 2

Combination of starting materials for producing CK1

| | CK1 | | |
|---|---|---|---|
|  | SLG | FA | CaO |
| % weight | 5 | 30 | 65 |

Figure 1:
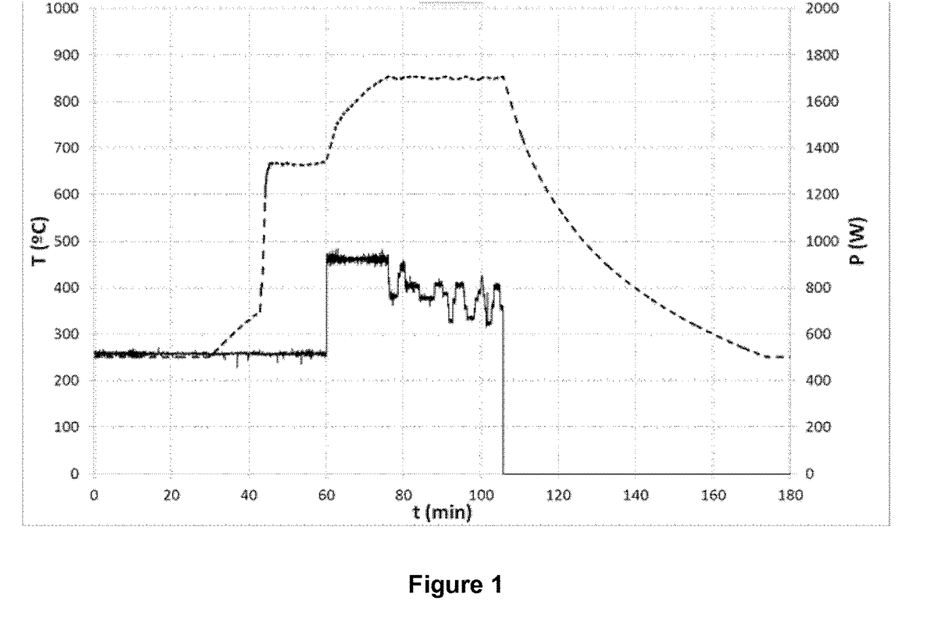
FIG. 1: MW heating protocol for producing CK1. Y1 axis: Temperature (T) in ° C. Y2 axis: Power (P) in Watts. X-axis: Time (t) in minutes.

200 g of the initial raw meal mixture was introduced in a multimode MW furnace (SAIREM GMP 60KI 6 kW) and irradiated with MW with the MW generator working at a frequency of 2.45 GHz. The MW heating protocol is shown in FIG. 1. Sintering temperature was reached at 850° C. CK1 was formed by maintaining the sintering temperature during 30 min, after which the MW power was switched off and the sample cooled naturally in the same MW oven. As an output of the process, a clinker (CK1) was obtained. Afterwards the composition of the resulting clinker was investigated by means of powder X-ray diffraction (XRD). XRD experiments were carried out with a PANalytical X'Pert PRO MPD diffractometer operating with copper radiation at 45 kV and mA. The scanning was performed over an angular range from 4 to 70° 2θ for 3 hours. The external standard method (D Jansen et al. *Cement and Concrete Research* 41(6): 602-608 (2011)) was used for the quantification of the phase composition including X-ray-amorphous contents. Alumina ($Al_2O_3$) (NIST SRM 676-a) was used as external standard and the software employed for the refinement was the TOPAS 4.2 of Bruker.

As shown in Table 3, the refinement of the above Rietveld analysis revealed that the CK1 was mainly based on the phases present in Ordinary Portland Cements, Alite (C3S), Belite (C2S), Aluminate (C3A), Ferrite (C4AF), together with some minor content of free CaO, MgO, $SiO_2$ (cristoballite) and X-ray amorphous material. This result is highly surprising since OPCs have been never reported at these low temperatures (850° C.).

TABLE 3

Rietveld analysis of CK1

| Formula | Weigth % |
|---|---|
| $Ca_3SiO_5$ (C3S) Alite | 51.2 |
| $Ca_2SiO_4$ (C2S) Belite | 15.6 |
| $Ca_3Al2O_6$ (C3A) | 13.2 |
| $Ca_2AlFeO_5$ (C4AF) | 12.8 |
| CaO (Free) | 2.3 |
| MgO (periclase) | 0.2 |
| $CaSO_4$ (anhidrite) | 0.2 |
| $SiO_2$ (cristobalite) | 0.1 |
| x-ray amorphous | 4.4 |

Figure 2:
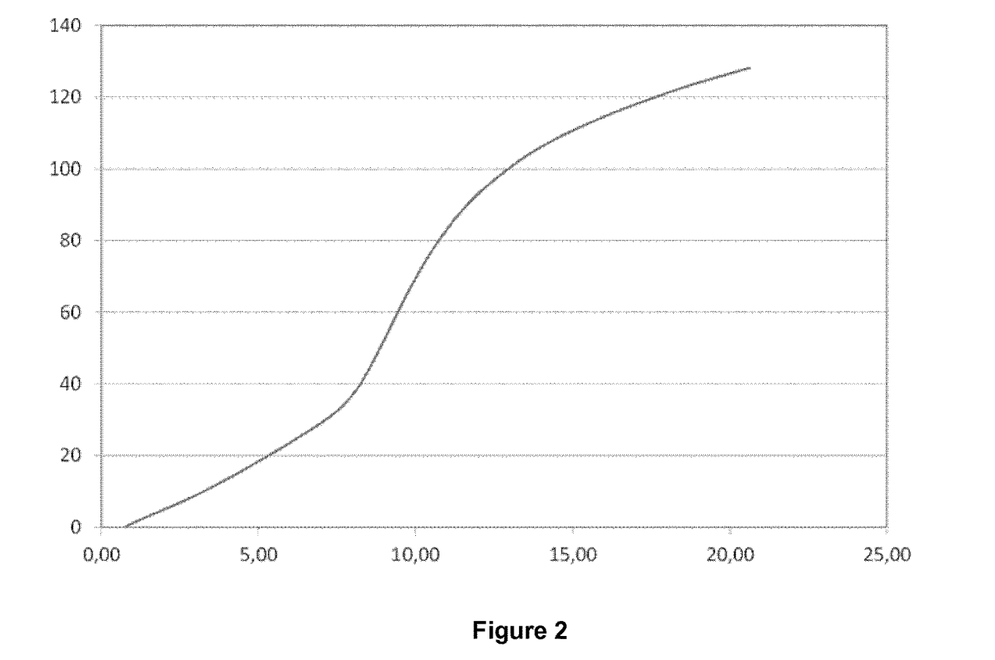
FIG. 2: Heat release for CK1. Horizontal axis: time (h); vertical axis: Heat (J/g)

After seeing that the composition matches well the typical composition of a OPC, the hydraulic reactivity of the obtained clinker was assessed by isothermal heat calorimetry. To this end CK1 was previously mixed with gypsum ($CaSO_4*2H_2O$) in a proportion 95%-5% by weight. The cummulative normalized heat release can be seen in FIG. 2, where it is evident that the cement obtained with CK1 exhibits values consistant with the heat releases produced in commercial OPCs (typically between 100-200 J/g at 20 hours).

Finally the compressive and flexion strength of cement paste prepared with the CK1 were tested over time (2, 7, 28 days). All samples employed a normal water-to-cement ratios equal to 0.35 and molded and cured in 4×4×16 cm prisms following the EN 196-1. The obtained results can be seen in the Table 4:

TABLE 4

Mechanical properties (2, 7, 28 days) of cement paste samples obtained from the CK1.

| Compressive Strength at 2 days | 27.89 ± 2.11 Mpa |
|---|---|
| Compressive Strength at 7 days | 31.52 ± 2.1 Mpa |
| Compressive Strength at 28 days | 43.26 ± 1.83 Mpa |

TABLE 4-continued

Mechanical properties (2, 7, 28 days) of cement paste samples obtained from the CK1.

| | |
|---|---|
| Flexural Strength at 2 days | 9.09 ± 0.53 MPa |
| Flexural Strength at 7 days | 10.85 ± 0.92 MPa |
| Flexural Strength at 28 days | 11.61 ± 0.81 MPa |

As can be seen, the mechanical properties of the CK1 fulfills the requirements of a CEM 42.5R according to ENV 197-1-classification of common cement types by strength.

Example 2: CK2: OPC Clinker

In this example a recycled cement paste was employed as starting material for producing a OPC binder. In particular, the oxide composition of the employed cement paste is disclosed in Table 5.

TABLE 5

Composition of the starting materials for CK2.

| | CK2 | | | | | | |
|---|---|---|---|---|---|---|---|
| | $SiO_2$ | $Al_2O_3$ | $Fe_2O_3t$ | MnO | MgO | CaO | $Na_2O$ |
| % weight | 16.84 | 5.35 | 2.52 | 0.06 | 1.11 | 51.56 | 0.17 |

| | CK2 | | | | |
|---|---|---|---|---|---|
| | $K_2O$ | $TiO_2$ | $P_2O_5$ | $SO_3$ | PC |
| % weight | 0.39 | 0.21 | 0.15 | 3.64 | 16.86 |

Figure 3:
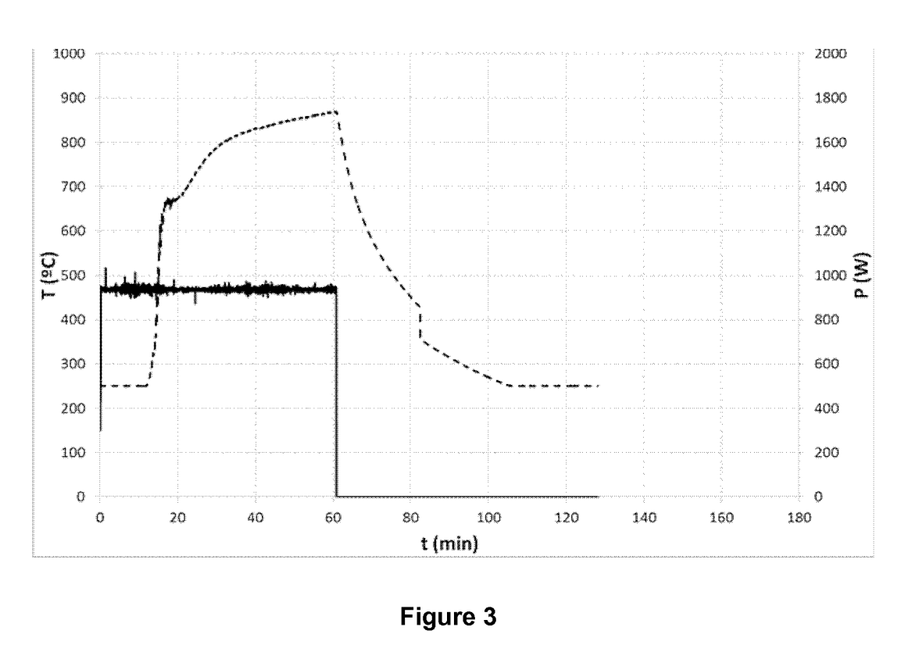
FIG. 3: MW heating protocol for producing CK2. Y1 axis: Temperature (T) in ° C. Y2 axis: Power (P) in Watts. X-axis: Time (t) in minutes.

As cement pastes consist of unreacted cement grains and hydrated phases like Portlandite and C—S—H gel, they are good candidates as starting materials for the process of the invention. In this example 100 g of the initial raw materials (the cement paste) was introduced in a multimode MW furnace and irradiated with MW with the MW generator working at a frequency of 2.45 GHz. The MW heating protocol is shown in FIG. 3. Sintering temperature was reached at 850° C. The CK2 was formed by maintaining the sintering temperature during 30 min, after which the MW power was switched off and the sample cooled naturally in the same MW oven.

As an output of the MW heating process, an OPC clinker was obtained. The resulting clinker was analyzed by XRD and the composition analyzed by Riedvelt analysis using the external standard method (supra), all as described above. The crystalline composition of CK2 is disclosed in Table 6.

TABLE 6

Rietveld analysis of CK2

| Formula | Weigth % |
|---|---|
| $Ca_3SiO_5$ (C3S) | 30.3 |
| $Ca_2SiO_4$ (C2S) | 49.7 |
| $Ca_3Al_2O_6$ (C3A | 4.9 |
| $Ca_2AlFeO_5$ (C4AF) | 10.2 |
| $CaSO_4 H_2O$ (C$H0.5) | 1.6 |
| C2AS | 1.4 |
| $Ca_4Al_6O_{12}SO_4$ (C4A3$) | 1.9 |

While the mayor phases of CK2 correspond to the ones of OPCs (C3S, C2S, C3A and C4AF), it is remarkable that the CK2 also contains a small portion of yeelemite (C4A3$), a key phase of calcium sulfoaluminate clinkers.

Figure 4:
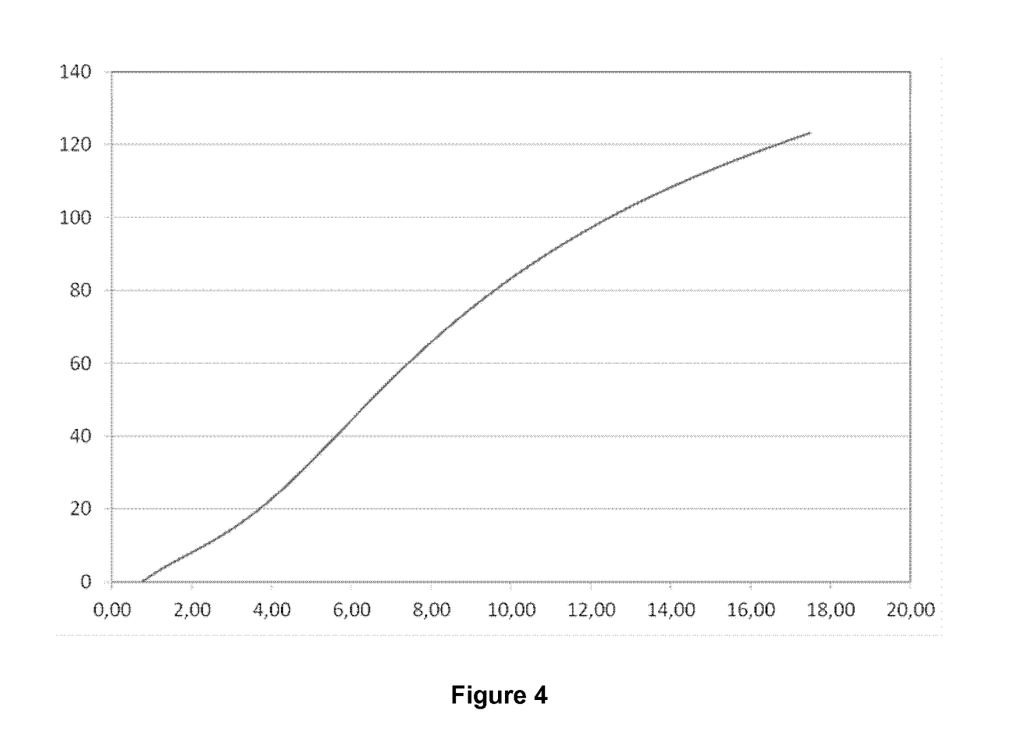
FIG. 4: Heat release of CK2. Horizontal axis: time (h); vertical axis: Heat (J/g)

The hydraulic reactivity was assessed by isothermal heat calorimetry. To this end CK2 was previously mixed with gypsum ($CaSO_4*2H_2O$) in a proportion 95%-5% by weight. The cummulative normalized heat release can be seen in FIG. 4, from which can be stated that the heat release matches well those found in OPCs.

Example 3. CK3: A Fly-Ash Belite Clinker (FABC) Obtained at 400° C.

In this example a Fly Ash Belite clinker (FABC) containing reactive $\alpha'_L$-C2S phases can been produced by MW heating at surprisingly low temperatures (400° C.) selecting as starting materials Calcium Alumino Silicate Hydrate minerals and slags.

For preparing the FABC (hereafter called CK3), a composition containing 52% by weigh of Katoite (C3ASH), 21.2% by weight of α-CSH, 2.4% by weight of Calcite and 23.9% by weight of X-ray amorphous elements (this composition is herein called PreBelite, PB) was mixed with SLG (composition of the SLG as shown in table 1) in proportions of 95% and 5% in weigh respectively (see Table 7). The PB was obtained mixing FA (composition of the FA as shown in table 1) with CaO so as to get a C/S molar ratio of 2 and kept under hydrothermal treatment at water-to-solid ratio of 5 for 4 hours at 200° C. and endogeneous pressure

TABLE 7

Composition of the starting materials for CK3

| | CK3 | |
|---|---|---|
| | SLG | PB |
| % weight | 5 | 95 |

Figure 5:
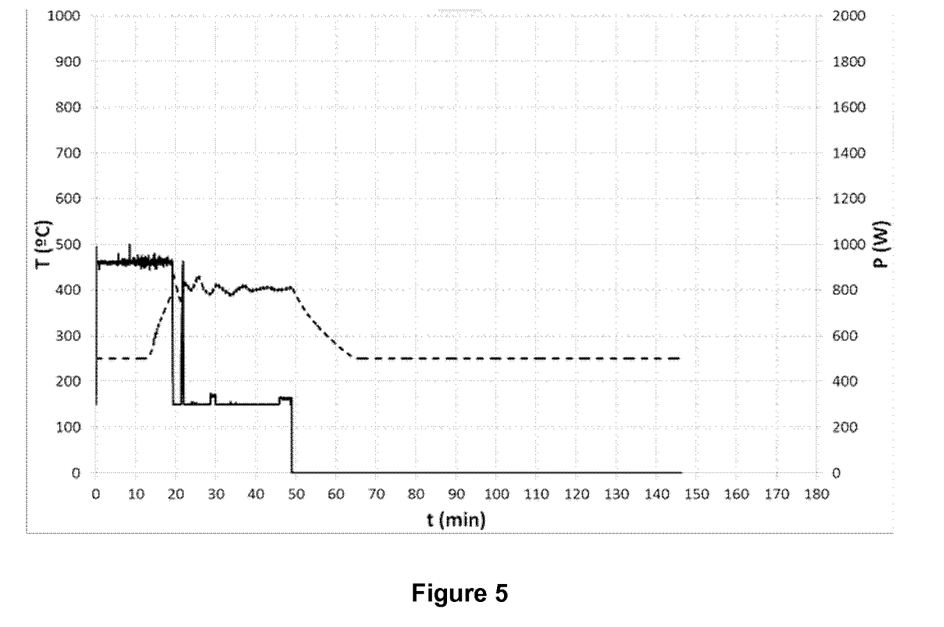
FIG. 5: MW heating protocol for producing CK3 Y1 axis: Temperature (T) in ° C. Y2 axis: Power (P) in Watts. X-axis: Time (t) in minutes.

Afterwards the mixed sample was subjected to a MW heating protocol as shown in FIG. 5. The resulting CK3 was later investigated by means of powder X-ray diffraction (XRD) and Rietveld analysis as described above.

The refinement of the Rietveld analysis (Table 8) revealed that CK3 is mainly composed by $\alpha_L'$-(C2S), gehlenite, minor traces of calcite and X-ray-amorphous content. Obtaining these active phases at a sintering temperature of 400° C. is very surprising, as this temperature is much lower than the temperature previously ascribed to the formation of such phases.

TABLE 8

Rietveld analysis of CK3

| Formula | % |
|---|---|
| $\alpha_L'$-$Ca_2SiO_4$ (C2S) | 19.5 |
| Gehlenite $Ca_2Al(Al,Si)O_7$ | 38.5 |
| Calcitae $CaCO_3$ | 0.3 |
| x-ray amorphous | 41.6 |

Figure 6:
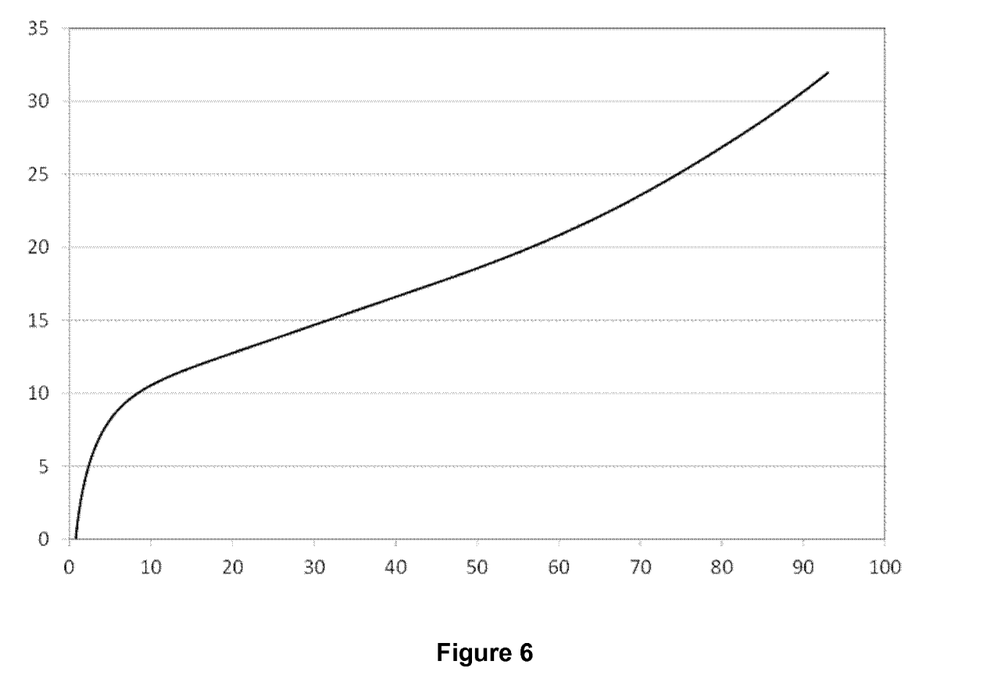
FIG. 6: Heat release of CK3. Horizontal axis: time (h); vertical axis: Heat (J/g)

The heat release of CK3 can be seen in FIG. 6.

Being a Belite based clinker, the heat release of CK3 is very modest in comparison to the heat release of OPC clinkers. However it is worth noting that in spite of having a big amount of inert phases like gehlenite (38.5% bw) the heat release of the CK3 (about 35 J/gh at 90 hours) exceeds the heat release reported in M. S. Hernendez et al. J. Am. Ceram. Soc., 94 [4] 1265-1271 (2011) for the hydration of pure β-C2S samples (about 20 J/gh at 90 hours). This illustrates both the importance of obtaining reactive $\alpha_L'$-C2S phases and the convenience of the MW-clinkerization protocol for their low temperature synthesis.

REFERENCES CITED IN THE APPLICATION

Fang Y et al, "Microwave clinkering of ordinary and colored Portland cements", *Cem. Concr. Res.* (1996), vol. 26, p. 41-47.
Li H et al, "Formation and hydration of $C_3S$ prepared by microwave and conventional sintering", *Cem. Concr. Res.* (1999), vol. 29, p. 1611-1617.
Ma B G et al, "Formation of tricalcium silicate prepared by electric and microwave sintering", *Adv. Mater. Res.* (2011), vol. 148, p. 1119-1123.
Long S et al. "Microwave-promoted burning of Portland cement clinker", *Cement and Concrete Research* (2002), vol. 32(1), p. 17-21.
Long S, et al. "Microwave promoted clinkering of sulfoaluminate cement", *Cement and Concrete Research* (2002), vol. 32, p. 1653-1656
Gartner E et al, "Industrially interesting approaches to "low-CO2" cements", *Cement and Concrete Research* (2004), Vol. 34, p 1489-1498.
D Jansen et al. "A Remastered External Standard Method Applied to the Quantification of Early OPC Hydration", *Cement and Concrete Research* 41(6): 602-608 (2011).
M. S. Hernendez et al. J. Am. Ceram. Soc., 94 [4] 1265-1271 (2011).
G. Álvarez-Pinazo et al. "Rietveld quantitative phase analysis of Yeelimite-containing cements", *Cement and concrete Research* (2012), vol. 42, Issue 7, p. 960-971.
T. Link et al., "Reactivity and phase composition of Ca2SiO4 binders made by annealing of alpha-dicalcium silicate hydrate", *Cement and Concrete Research* 67 (2015) 131-137

CLAUSES

1. A process for producing a cement clinker comprising the steps of:
(i) mixing one or more starting materials providing each: at least one or more of CaO, $SiO_2$, $Al_2O_3$, and $Fe_2O_3$; and, optionally, $SO_3$; and/or at least other one or more compounds comprising the elements of these oxides, to form a raw meal comprising CaO, $SiO_2$, $Al_2O_3$, and $Fe_2O_3$; and, optionally, $SO_3$; and/or at least other one or more compounds comprising the elements of these oxides, wherein the molar ratios among the aforementioned oxides and/or other one or more compounds comprising the elements of these oxides is given by Formula I:

$(CaO)_1(SiO_2)_a(Al_2O_3)_b(Fe_2O_3)_c(SO_3)_d$ (Formula I)

wherein:
"a" is comprised from 0.05 to 1,
"b" is comprised from 0.01 to 0.6,
"c" is comprised from 0.001 to 0.25, and
"d" is comprised from 0 to 0.3;
(ii) heating the raw meal by irradiating with microwaves until reaching a sintering temperature comprised in a range from 300 to 950° C., wherein the irradiating time to reach the sintering temperature is comprised in a range from 15 min to 3h;
(iii) maintaining the microwave sintering temperature of step (ii) during a time comprised from 1 min to 3 h by further irradiating with microwaves; and
(iv) cooling the clinker obtained in step (iii)

2. The process according to claim 1, that additionally comprises grinding the product obtained from step (iv) to a fine powder.
3. The process according to any of the claims 1-2, wherein at least 35% (p/p) of the starting materials of the raw meal have a critical microwaves absorbance temperature (Tc) comprised from 15 to 650° C. and a critical microwaves absorbance time (tc) comprised from 1 min to 1 h.
4. The process according to any of the claims 1-3, wherein:
the one or more starting materials providing $SiO_2$ and/or the other compounds comprising the elements of this oxide, have a critical microwaves absorbance temperature (Tc) from 15 to 650° C. and critical microwaves absorbance time (tc) from 1 to 30 min,
the one or more starting materials providing $Al_2O_3$ and/or the other compounds comprising the elements of this oxide have a Tc from 15 to 650° C. and tc from 1 to 30 min,
the one or more starting materials providing $Fe_2O_3$ and/or the other compounds of the elements of this oxide has a Tc from 15 to 100° C. and tc from 1 to 15 min
the one or more starting materials providing $SO_3$ and/or the other compounds comprising the elements of this oxide, if present, have Tc from 15 to 650° C. and tc from 1 min to 2 h,
5. The process according to any of the claims 1-4, wherein the one or more starting materials providing CaO and/or the other compounds comprising the elements of this oxide are selected from calcium oxides and compounds that have a Tc from 15 to 950° C. and tc from 1 min to 2 h.
6. The process according to any of the claims 1-5, wherein:
the one or more starting materials providing $Fe_2O_3$ and/or the other compounds comprising the elements of this oxide are selected from iron oxides, iron oxyhydroxides, iron sulfides, calcium ferrites, iron-containing nesosilicates, iron-containing sorolicates, iron-containing ionosilicates and iron-containing phyllosilicates,
the one or more starting material providing $SiO_2$ and/or the other compounds comprising the elements of this oxide are selected from nesosilicates, sorolicates, ionosilicates, phyllosilicates and defected and amorphous tectosilicates,
the one or more or starting materials providing $Al_2O_3$ and/or the other compounds comprising the elements of this oxide are selected from aluminium-containing nesosilicates, aluminium-containing sorolicates, aluminium-containing ionosilicates, aluminium-containing phyllosilicates and aluminium-containing defected and amorphous tectosilicates,
the one or more starting material providing CaO and/or the other compounds comprising the elements of this oxide are selected from calcium oxides, calcium hydroxides, calcium carbonates, calcium ferrite, calcium sulfates, calcium-containing aluminosilicates, calcium-containing nesosilicates, calcium-containing sorolicates, calcium-containing ionosilicates, and calcium-containing phyllosilicates.
the one or more starting materials providing $SO_3$ and/or the other compounds comprising the elements of this oxide, if present, are selected from sulfoferrite and gypsum
7. The process according to claim 6, wherein:
the one or more starting materials providing $Fe_2O_3$ and/or the other compounds comprising the elements of this oxide are selected from $Fe_2O_3$, $Fe_3O_4$, Fayalite, Andradite Staurolite, Datolite, Titanite, Humite, Chloritoid, $(Mg,Fe)_7(SiO_4)_3(OH)_2$ and $((Mg,Fe)_7(SiO_4)_3(F,OH)_2)$, the one or more starting material providing SiO$_2$ and/or the other compounds comprising the elements of this oxide are selected from C$_2$SH, afwillite, xonotlite, tobermorite and calcium silicate hydrate (C—S—H), the one or more starting material providing Al$_2$O$_3$ and/or the other compounds comprising the elements of this oxide are selected from Al partially substituted variants of: C$_2$SH, afwillite, xonotlite, tobermorite and calcium silicate hydrate (C—S—H), the one or more starting material providing CaO and/or the other compounds comprising the elements of this oxide are selected from CaCO$_3$, CaO, Ca(OH)$_2$, CaSO$_4$.2H$_2$O, CaFe$_2$O$_4$, Ca$_2$Fe$_2$O$_5$, C$_2$SH, afwillite, xonotlite, tobermorite and calcium (aluminium) silicate hydrate (C-(A)-S—H), the one or more starting materials providing SO$_3$ and/or the other compounds comprising the elements of this oxide, if present, are selected from sulfoferrite.

8. The process according to any of the claims 1-7, wherein the one or more of the CaO, SiO$_2$, Al$_2$O$_3$, Fe$_2$O$_3$ and optionally, SO$_3$; or the other compounds comprising the elements of these oxides are hydrated and/or hydroxylated.

9. The process according to any of the claims 1-8, wherein one or more of the starting materials are selected from wastes and by products.

10. The process according to any of the claims 1-9, wherein one or more of the starting materials are selected from cement paste, fly ash, slag and calcium oxides.

11. The process according to claim 10, wherein the starting materials at least comprise a cement paste.

12. The process according to any of the claims 1-11, wherein the clinker comprises from 10 to 90% (w/w) Alite (C3S) with respect to total clinker product and wherein:
(i) formula I of the raw meal has the following stoichiometry:
"a" is comprised from 0.05 to 1,
"b" is comprised from 0.01 to 0.6,
"c" is comprised from 0.001 to 0.25, and
"d" is comprised from 0 to 0.3;
(ii) the sintering temperature is comprised from 500 to 950° C.

13. The process according to claim 12, wherein the clinker is an Ordinary Portland Cement (OPC) clinker and wherein:
(i) formula I of the raw meal has the following stoichiometry:
"a" is comprised from 0.2 to 0.5,
"b" is comprised from 0.01 to 0.05,
"c" is comprised from 0.001 to 0.05,
"d" is 0; and
(ii) the sintering temperature is comprised from 500 to 950° C.

14. The process according to any of the claims 1-11, wherein the clinker is a Calcium Sulfoaluminate clinker, and wherein:
(i) formula I of the raw meal has the following stoichiometry:
"a" is comprised from 0.05 to 0.5,
"b" is comprised from 0.01 to 0.6,
"c" is comprised from 0.005 to 0.10,
"d" is comprised from 0.05 to 0.3; and
(ii) the sintering temperature is comprised from 500° C. to 850° C.

15. The process according to any of the claims 1-11, wherein the clinker comprises from 15 to 90% (w/w) Belite with respect to total clinker product and wherein:
(i) formula I of the raw meal has the following stoichiometry:

"a" is comprised from 0.3 to 0.5,
"b" is comprised from 0.01 to 0.05,
"c" is comprised from 0.001 to 0.05,
"d" is 0; and
(ii) the sintering temperature is comprised from 250° C. to 650° C.

16. The process according to claim 15, wherein the clinker comprises from 15 to 75% (w/w) Belite in the form of α'$_L$C2S with respect to total clinker product.

17. A cement clinker obtainable by the process of any of the claims 1-16.

The invention claimed is:
1. A process for producing a cement clinker comprising the steps of:
(i) mixing one or more starting materials providing each: at least one or more of CaO, SiO$_2$, Al$_2$O$_3$, and Fe$_2$O$_3$; and, optionally, SO$_3$; and/or at least other one or more compounds comprising the elements of these oxides, to form a raw meal comprising CaO, SiO$_2$, Al$_2$O$_3$, and Fe$_2$O$_3$; and, optionally, SO$_3$; and/or at least other one or more compounds comprising the elements of these oxides, wherein the molar ratios among the aforementioned oxides and/or other one or more compounds comprising the elements of these oxides is given by Formula I:

$$(CaO)_1(SiO_2)_a(Al_2O_3)_b(Fe_2O_3)_c(SO_3)_d \qquad \text{(Formula I)}$$

wherein:
"a" is comprised from 0.05 to 1,
"b" is comprised from 0.01 to 0.6,
"c" is comprised from 0.001 to 0.25, and
"d" is comprised from 0 to 0.3,
and wherein at least 35% (p/p) of the starting materials of the raw meal have a critical microwaves absorbance temperature (Tc) comprised from 15 to 650° C. and a critical microwaves absorbance time (tc) comprised from 1 min to 1 h;
(ii) heating the raw meal by irradiating with microwaves until reaching a sintering temperature comprised in a range from 300 to 950° C., wherein the irradiating time to reach the sintering temperature is comprised in a range from 15 min to 3 h;
(iii) maintaining the microwave sintering temperature of step (ii) during a time comprised from 1 min to 3 h by further irradiating with microwaves; and
(iv) cooling the clinker obtained in step (iii).

2. The process according to claim 1, that additionally comprises grinding the product obtained from step (iv) to a fine powder.

3. The process according to claim 1, wherein:
the one or more starting materials providing SiO$_2$ and/or the other compounds comprising the elements of this oxide, have a critical microwaves absorbance temperature (Tc) from 15 to 650° C. and critical microwaves absorbance time (tc) from 1 to 30 min,
the one or more starting materials providing Al$_2$O$_3$ and/or the other compounds comprising the elements of this oxide have a Tc from 15 to 650° C. and tc from 1 to 30 min,
the one or more starting materials providing Fe$_2$O$_3$ and/or the other compounds of the elements of this oxide has a Tc from 15 to 100° C. and tc from 1 to 15 min
the one or more starting materials providing SO$_3$ and/or the other compounds comprising the elements of this oxide, if present, have Tc from 15 to 650° C. and tc from 1 min to 2 h.

4. The process according to claim 1, wherein the one or more starting materials providing CaO and/or the other compounds comprising the elements of this oxide are selected from calcium oxides and compounds that have a Tc from 15 to 950° C. and tc from 1 min to 2 h.

5. The process according to claim 1, wherein:
the one or more starting materials providing $Fe_2O_3$ and/or the other compounds comprising the elements of this oxide are selected from iron oxides, iron oxyhydroxides, iron sulfides, calcium ferrites, iron-containing nesosilicates, iron-containing sorolicates, iron-containing ionosilicates and iron-containing phyllosilicates,
the one or more starting material providing $SiO_2$ and/or the other compounds comprising the elements of this oxide are selected from nesosilicates, sorolicates, ionosilicates, phyllosilicates and defected and amorphous tectosilicates,
the one or more or starting materials providing $Al_2O_3$ and/or the other compounds comprising the elements of this oxide are selected from aluminium-containing nesosilicates, aluminium-containing sorolicates, aluminium-containing ionosilicates, aluminium-containing phyllosilicates and aluminium-containing defected and amorphous tectosilicates,
the one or more starting material providing CaO and/or the other compounds comprising the elements of this oxide are selected from calcium oxides, calcium hydroxides, calcium carbonates, calcium ferrite, calcium sulfates, calcium-containing aluminosilicates, calcium-containing nesosilicates, calcium-containing sorolicates, calcium-containing ionosilicates, and calcium-containing phyllosilicates,
the one or more starting materials providing $SO_3$ and/or the other compounds comprising the elements of this oxide, if present, are selected from sulfoferrite and gypsum.

6. The process according to claim 5, wherein:
the one or more starting materials providing $Fe_2O_3$ and/or the other compounds comprising the elements of this oxide are selected from $Fe_2O_3$, $Fe_3O_4$, Fayalite, Andradite Staurolite, Datolite, Titanite, Humite, Chloritoid, $(Mg,Fe)_7(SiO_4)_3(OH)_2$ and $((Mg,Fe)_7(SiO_4)_3(F,OH)_2)$,
the one or more starting material providing $SiO_2$ and/or the other compounds comprising the elements of this oxide are selected from $C_2SH$, afwillite, xonotlite, tobermorite and calcium silicate hydrate (C—S—H),
the one or more starting material providing $Al_2O_3$ and/or the other compounds comprising the elements of this oxide are selected from Al partially substituted variants of: $C_2SH$, afwillite, xonotlite, tobermorite and calcium silicate hydrate (C—S—H),
the one or more starting material providing CaO and/or the other compounds comprising the elements of this oxide are selected from: $CaCO_3$, CaO, $Ca(OH)_2$, $CaSO_4.2H_2O$, $CaFe_2O_4$, $Ca_2Fe_2O_5$, $C_2SH$, afwillite, xonotlite, tobermorite and calcium (aluminium) silicate hydrate (C-(A)-S—H),
the one or more starting materials providing $SO_3$ and/or the other compounds comprising the elements of this oxide, if present, are selected from sulfoferrite.

7. The process according to claim 1, wherein the one or more of the CaO, $SiO_2$, $Al_2O_3$, $Fe_2O_3$ and optionally, $SO_3$; or the other compounds comprising the elements of these oxides are hydrated and/or hydroxylated.

8. The process according to claim 1, wherein one or more of the starting materials are selected from wastes and by products.

9. The process according to claim 1, wherein one or more of the starting materials are selected from cement paste, fly ash, slag and calcium oxides.

10. The process according to claim 9, wherein the starting materials at least comprise a cement paste.

11. The process according to claim 1, wherein the clinker comprises from 10 to 90% (w/w) Alite (C3S) with respect to total clinker product and wherein:
(i) formula I of the raw meal has the following stoichiometry:
"a" is comprised from 0.05 to 1,
"b" is comprised from 0.01 to 0.6,
"c" is comprised from 0.001 to 0.25, and
"d" is comprised from 0 to 0.3;
(ii) the sintering temperature is comprised from 500 to 950° C.

12. The process according to claim 1, wherein the clinker is an Ordinary Portland Cement (OPC) clinker and wherein:
(i) formula I of the raw meal has the following stoichiometry:
"a" is comprised from 0.2 to 0.5,
"b" is comprised from 0.01 to 0.05,
"c" is comprised from 0.001 to 0.05,
"d" is 0; and
(ii) the sintering temperature is comprised from 500 to 950° C.

13. The process according to claim 1, wherein the clinker is a Calcium Sulfoaluminate clinker, and wherein:
(i) formula I of the raw meal has the following stoichiometry:
"a" is comprised from 0.05 to 0.5,
"b" is comprised from 0.01 to 0.6,
"c" is comprised from 0.005 to 0.10,
"d" is comprised from 0.05 to 0.3; and
(ii) the sintering temperature is comprised from 500° C. to 850° C.

14. The process according to claim 1, wherein the clinker comprises from 15 to 90% (w/w) Belite with respect to total clinker product and wherein:
(i) formula I of the raw meal has the following stoichiometry:
"a" is comprised from 0.3 to 0.5,
"b" is comprised from 0.01 to 0.05,
"c" is comprised from 0.001 to 0.05,
"d" is 0; and
(ii) the sintering temperature is comprised from 300° C. to 650° C.

* * * * *